United States Patent [19]

Uttke et al.

[11] Patent Number: 5,165,522
[45] Date of Patent: Nov. 24, 1992

[54] COLLECTOR FLIGHT ATTACHMENT LINK FOR COLLECTOR APPARATUS

[75] Inventors: Russell H. C. Uttke; John W. Quick, both of Greendale, Wis.; James H. Wiegand, Sun City West, Ariz.; Susan M. Rasper, Wales, Wis.

[73] Assignee: Rexnord Corporation, Milwaukee, Wis.

[21] Appl. No.: 705,758

[22] Filed: May 28, 1991

[51] Int. Cl.⁵ .............................................. B65G 19/14
[52] U.S. Cl. .................................. 198/716; 198/731; 198/719; 210/526
[58] Field of Search .................. 198/550.12, 719, 731, 198/734, 716; 210/525, 526, 523

[56] References Cited

U.S. PATENT DOCUMENTS

| | | | |
|---|---|---|---|
| 1,560,716 | 11/1925 | Newdick . | |
| 2,309,556 | 1/1943 | Walker | 210/55 |
| 2,846,053 | 8/1958 | Hyman | 198/731 |
| 3,313,422 | 4/1967 | Swenson | 210/523 |
| 3,394,816 | 7/1968 | Lowry | 210/525 |
| 4,123,947 | 11/1978 | Smith et al. | 74/245 |
| 4,271,663 | 6/1981 | Templin et al. | 59/84 |
| 4,518,077 | 5/1985 | Ronco et al. | 198/731 |
| 4,645,598 | 2/1988 | Hannum | 210/526 |
| 4,663,042 | 5/1987 | Rasper et al. | 210/525 |
| 4,950,398 | 8/1921 | Wiegand et al. | 210/232 |

FOREIGN PATENT DOCUMENTS 58-43126 9/1983 Japan .

OTHER PUBLICATIONS

Publication entitled "Rex Conveyor Sludge Collerctors", by Envirex, Inc. Waukesha, WI (copyright 1980), p. 5.
Publication entitled, "Rex Loop Chain for Heavy-Duty Sludge Collector Service", by Envirex, Inc., Waukesha, WI (copyright 1986), p. 3.

Primary Examiner—Joseph E. Valenza
Attorney, Agent, or Firm—Michael, Best & Friedrich

[57] ABSTRACT

A collector flight attachment link configured to have increased torsional load bearing ability and for supporting a collector flight on a chain including a plurality of interconnected chain links. The collector flight attachment link comprises an elongated lower link portion adapted to be interconnected with adjacent chain links in the chain. The flight attachment link also comprises a cantilevered collector flight support portion projecting upwardly from the lower link portion and including a paddle plate extending transversely to the link portion and having spaced apart first and second plate sections interconnected at their upper ends by a web section. Stress relief notches are provided between the lower edges of the paddle plate and the lower link portion.

24 Claims, 4 Drawing Sheets

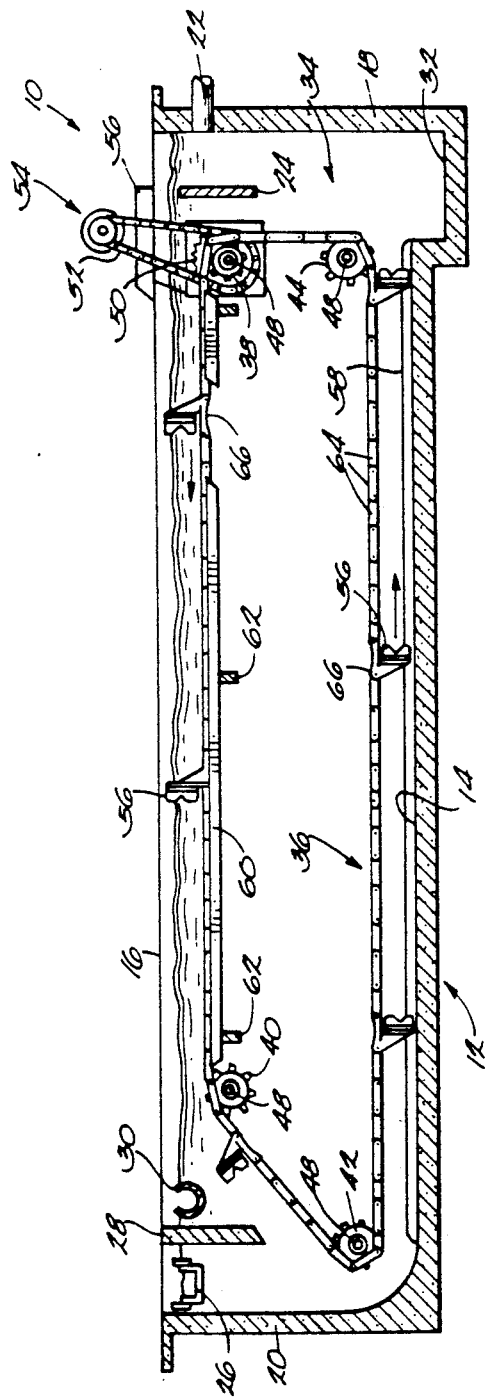

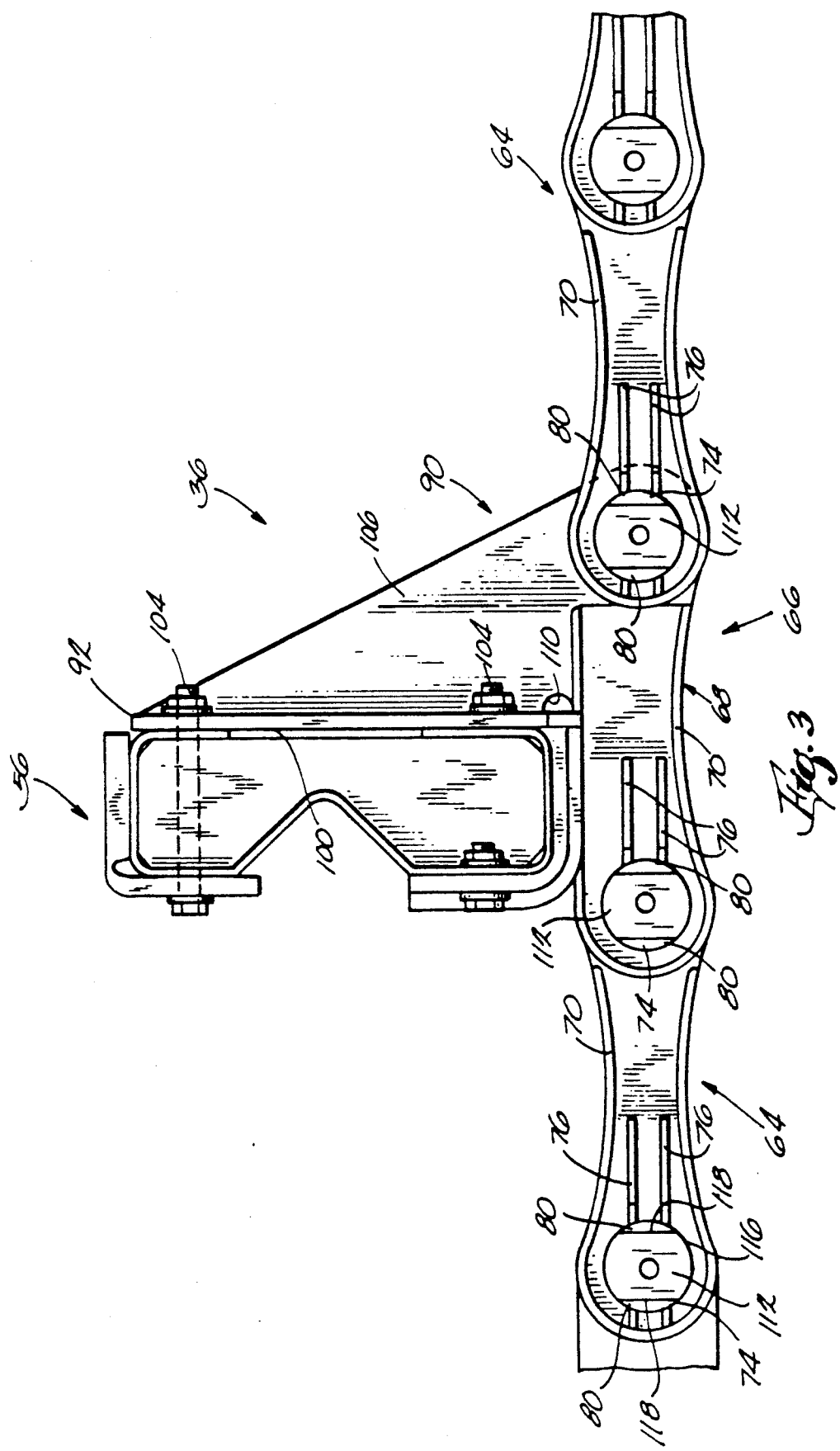

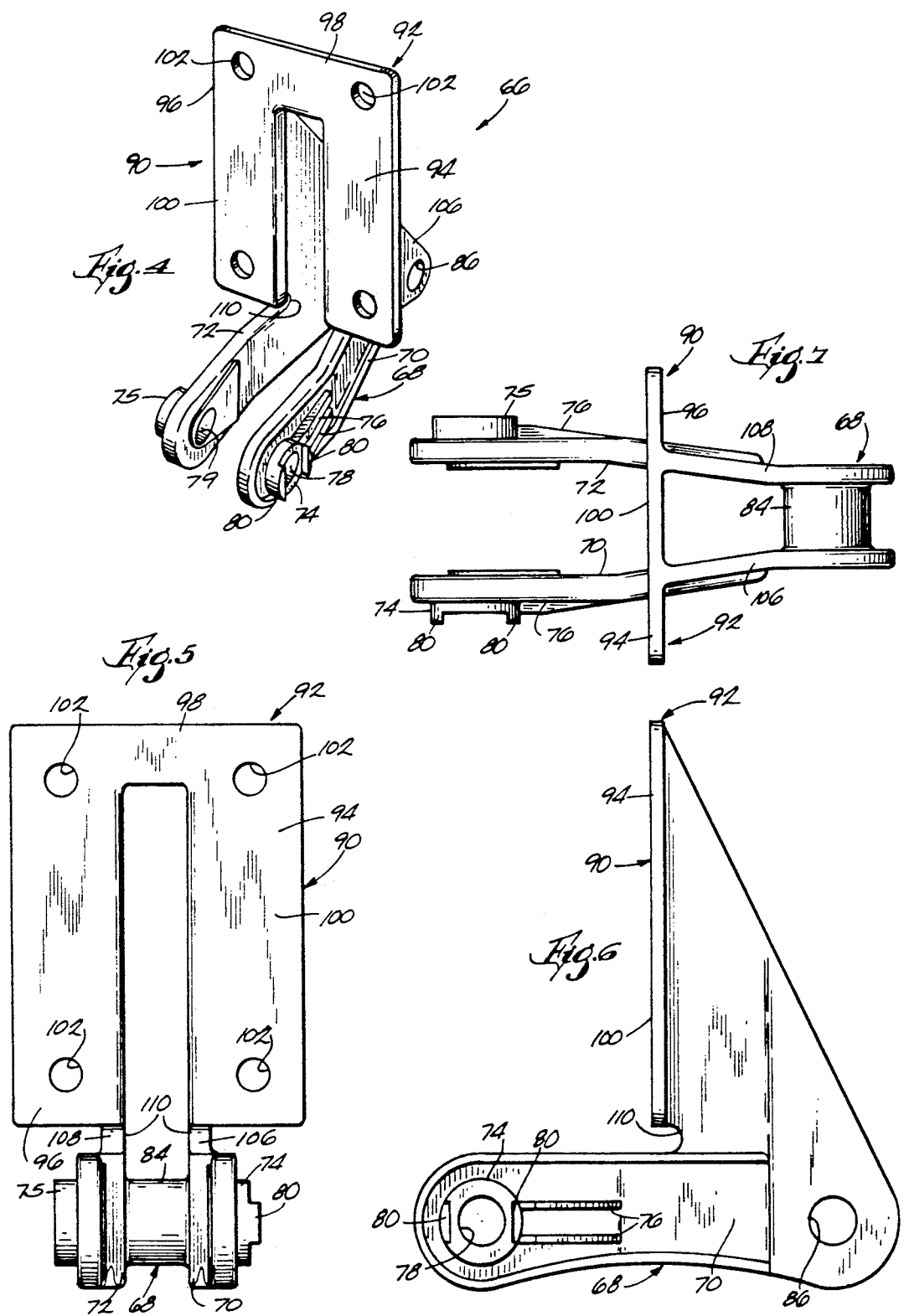

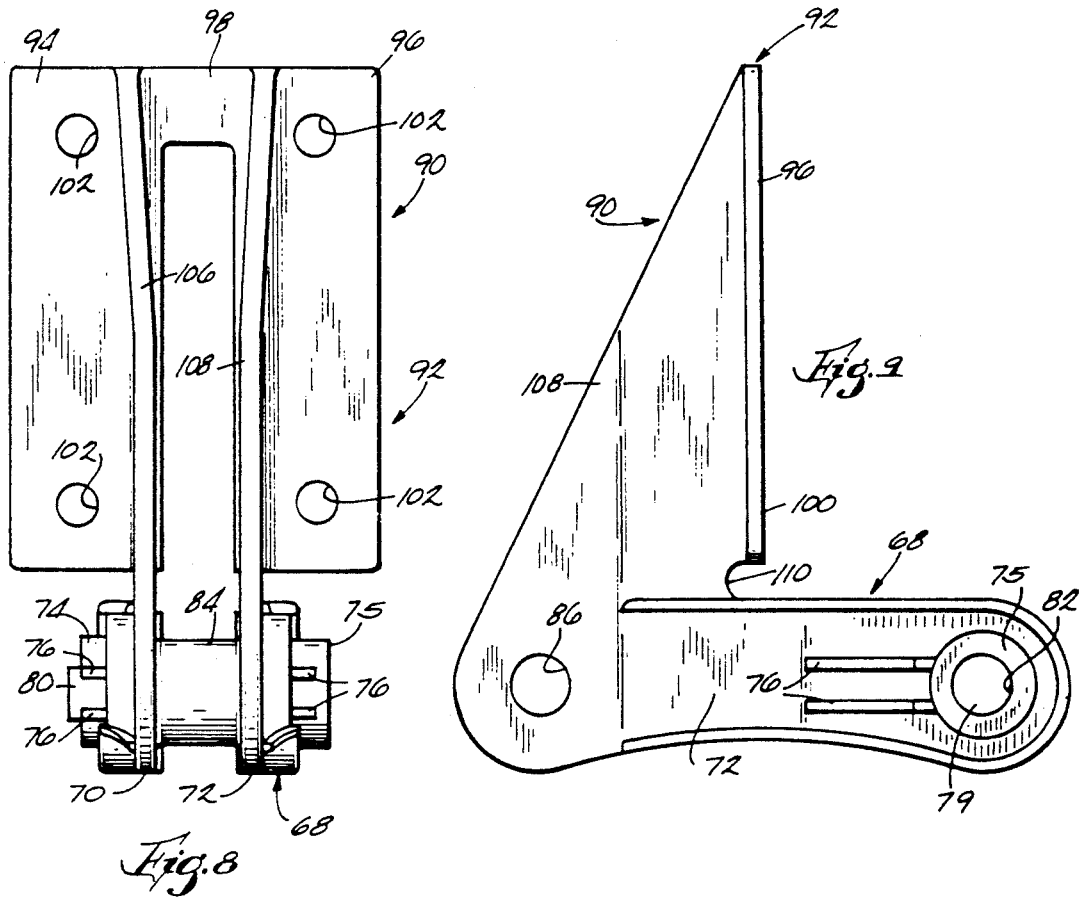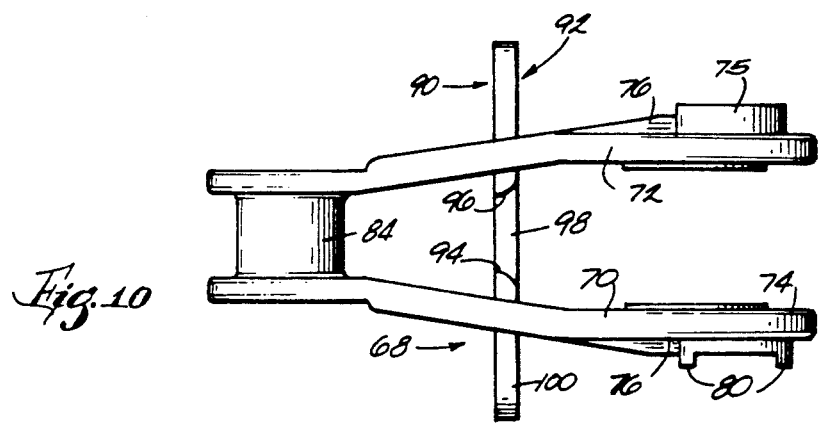

COLLECTOR FLIGHT ATTACHMENT LINK FOR COLLECTOR APPARATUS

BACKGROUND OF THE INVENTION

1. Field of the Invention

The present invention relates generally to collector apparatus which are useful in sewage treatment and liquid treatment plants and which employ chains including collector flight attachment links for carrying collector flights. More particularly, the present invention relates to a collector flight attachment link configured to have improved torsional flexibility and load bearing capabilities.

2. Reference to Prior Art

Sludge and scum collector mechanisms are commonly used in wastewater treatment tanks to scrape the settled sludge from the bottom of the tank and to skim the floating scum from the surface of the wastewater. Typically, collector mechanisms include a pair of spaced apart endless chains trained over collector chain sprockets which are mounted on cross shafts supported on the side walls of the tank, and elongated transverse collector flights supported between the chains. One of the sprockets is driven so that the chain loops revolve to provide a succession of collector flights along the bottom of the tank as well as along the surface of the water in the tank to accomplish the scraping and skimming functions. Successive collector flights push scum and sludge into collection areas of the tank for removal.

In conventional applications, each chain includes uniformly interspaced collector flight attachment links on which the collector flights are mounted. In some prior art arrangements the chains and the flight attachment links are made of metal. One such metal attachment link is illustrated in U.S. Pat. No. 3,313,422 issued Apr. 11, 1967 to Swenson which shows an attachment link consisting generally of a chain link portion provided with an upwardly projecting integral member on which a collector flight is mounted.

The combined factors of cost, weight and corrosion have created a trend in the wastewater industry to greater use of plastics and other non-metallic materials. Consequently, more recent developments in chains for wastewater treatment applications involve the use of non-metallic materials.

Flight attachment links made of non-metallic materials are well known. A sales bulletin produced by Envirex, Inc., Waukesha, Wisconsin and entitled "Conveyor Sludge Collector", Copyright 1980, discloses a flight attachment link made of acetal resin. This flight attachment link has a link portion that includes a pair of spaced apart sidebars and that can be interconnected with other chain links to form a chain, and a collector flight support portion which projects upwardly from the link portion. More particularly, the flight attachment portion includes a generally rectangular paddle plate which extends integrally from the top edges of the sidebars. A collector flight is mountable on the forwardly facing front surface of the paddle plate. Reinforcement members extend integrally from the top edges of the sidebars to the back of the paddle plate. A similarly constructed flight attachment link is shown in U.S. Pat. No. 4,663,042 issued May 5, 1987 to Rasper et al.

SUMMARY OF THE INVENTION

The present invention provides a collector flight attachment link which is useful to support a collector flight on a chain, and which is configured to provide improved load carrying capabilities over standard flight attachment links.

It has been observed that polymeric collector flight attachment links of conventional design are susceptible to failure due to torsional distortion such as results from the misindexing or cocking of the attachment links during service. Additionally, the shear weight of the accumulated waste material being conveyed by the collector flights, as evidenced by the tendency of the rather long unsupported midspan areas of the collector flights to deflect under this weight, applies a torsional load to the paddle plate which contributes to sudden or eventual attachment link failure. In conventional attachment link designs, such failures appear most prevalent in the area of the juncture between the paddle plate and the sidebars as well as in the paddle plate itself.

To alleviate the problem of flight attachment link failure due to the imposition of high or cyclical torsional loads, the attachment link of the present invention is provided with a split paddle plate configuration for improved torsional flexibility and load bearing capabilities. Additionally, one or more stress relief notches are preferably provided between the paddle plate and the lower link portion or sidebars of the flight attachment link. This design permits the flight attachment link to accept without failure both greater torsional loads and greater torsional distortion of the flight support portion relative to the link portion.

More specifically, the present invention provides a collector flight attachment link for supporting a collector flight on a chain including a plurality of interconnected chain links. The collector flight attachment link comprises an elongated lower link portion adapted to be interconnected with adjacent chain links in the chain, and a cantilevered collector flight support portion projecting upwardly from the link portion. The collector flight support portion includes a support plate extending transversely to the link portion and having spaced apart first and second plate sections each including a forwardly facing surface, the forwardly facing surfaces together defining a support surface adapted to support the collector flight.

In a preferred embodiment of the invention the upper ends of the spaced apart plate sections are interconnected by a web section, and a stress relief notch is provided at the base of each plate section between the respective plate section and the lower link portion.

Other features and advantages of the invention will become apparent to those skilled in the art upon review of the following detailed description, claims and drawings.

BRIEF DESCRIPTION OF THE DRAWINGS

FIG. 1 is a longitudinal sectional view of a wastewater treatment tank including collector chains embodying various features of the invention.

FIG. 2 is an enlarged partial top elevational view, partially in section, of the chain illustrated in FIG. 1 and shown with the collector flight removed.

FIG. 3 is a side elevational view of the chain illustrated in FIG. 2 and illustrating a collector flight attached to the flight attachment link.

FIG. 4 is a perspective view of the collector flight attachment link illustrated in FIG. 3.

FIG. 5 is an enlarged front view of the attachment link illustrated in FIG. 4.

FIG. 6 is a left side view of the attachment link illustrated in FIG. 5.

FIG. 7 is a top view of the attachment link illustrated in FIG. 5.

FIG. 8 is a rear view of the flight attachment illustrated in FIG. 5.

FIG. 9 is a right side view of the attachment link illustrated in FIG. 5.

FIG. 10 is a bottom view of the attachment link illustrated in FIG. 5.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

GENERAL DESCRIPTION

Illustrated in FIG. 1 is a sediment removal or wastewater treatment apparatus 10 which embodies various features of the invention and which functions to remove waste material such as settleable solids or sludge and floatable wastes or scum from wastewater, although other liquids could also be treated.

The wastewater treatment apparatus 10 includes a primary sedimentation or settling tank 12 which is usually formed of reinforced concrete. The tank 12 includes a bottom 14, a pair of opposite side walls 16 (one is shown), an influent end wall 18, and an effluent end wall 20, which together define the tank 12. A conduit 22 extends through the influent end wall 18 for delivering wastewater into the tank 12. A first baffle 24 extends across the top of the tank 12, between the side walls 16, and downwardly in front of and somewhat below the conduit 22 to minimize the turbulence created by the influent flow. The wastewater flows steadily through the tank 12 from the influent end wall 18 to the effluent end wall 20 where one or more box weirs 26 (one is shown) are located to provide transverse channels for the flow of wastewater out of the tank 12. A second baffle 28 extends across the tank 12 in a position upstream of the effluent end wall 20 to prevent floating wastes from flowing downstream to the weir 26. The tank 12 is also provided with scum and sludge collection troughs 30 and 32 respectively positioned upstream of the second baffle 28 and adjacent the influent end wall 18 for the eventual removal of wastes from the tank 12.

As the wastewater flows through the tank 12 the sludge descends to the bottom 14 while the scum floats to the surface of the wastewater. Accordingly, the wastewater treatment apparatus 10 also includes a waste collector mechanism or apparatus 34 supported in the tank 12 for removing the floating and submerged waste.

The collector apparatus 34 includes a pair of endless chains 36 (only one is shown) each located adjacent one of the side walls 16 and the construction of which will be more fully explained below. The endless chains 36 are arranged in parallel relation to each other and are trained around pairs of toothed sprockets 38, 40, 42 and 44 which each engage the chains 36 to guide their travel in the tank 12. Each pair of sprockets 38, 40, 42, and 44 is mounted on one of four transversely extending shafts 48, the ends of which are rotateably mounted in bearings (not shown) secured in the side walls 16. To rotate the chains 36 within the tank 12, the shaft 48 for the pair of sprockets 38 has a driving sprocket 50 secured thereto and engaged by a driving chain 52 extending downwardly from a power drive unit 54 mounted on a platform 56 above the tank 12. The chains 36 are preferably driven in a counterclockwise direction.

The endless chains 36 serve as carriers for a plurality of elongated collector flights 56 which extend transversely between the chains 36 and at sequential positions along the chains 36. An example of a suitable collector flight is illustrated in U.S. Pat. No. 4,663,042 issued May 5, 1987 to Rasper et al., and the disclosure of this patent is incorporated herein by reference. As the endless chains 36 travel within the tank 12 the flights 56 are guided in a lower run along the bottom 14 to scrape sludge therefrom, and in an upper run along the surface of the wastewater to skim floating waste from the surface.

To guide the flights 56 in the lower run lower tracks or rails 58 (only one is shown) are embedded in the bottom 14. To support the chains 36 while in the upper run longitudinally extending upper tracks or rails 60 (only one is shown) are secured along the side walls 16 using a plurality of spaced apart brackets 62. The upper rails 60 are located at such an elevation that the flights 56 are partially submerged in the wastewater as they ride along the rails 60.

During operation of the collector apparatus 34 the revolving chains 36 provide a succession of collector flights 56 in the upper run to skim floating waste from the surface of the wastewater. The floating waste is thereafter received in the scum trough 30 for discharge from the tank 12. The revolving chains 36 also provide a succession of flights 56 in the lower run to scrape the settled sludge from the bottom 14 for deposit into the sludge trough 32. The sludge is pumped from the sludge trough 32 intermittently or continuously in accordance with the process requirements.

The endless chains 36 of the present invention are preferably identical and a preferred chain configuration is illustrated in FIGS. 2 and 3, although other chain configurations could be employed. The illustrated chain 36 is fabricated of polymeric materials, but other materials could also be used.

The chain 36 shown in FIGS. 2 and 3 comprises a plurality of adjacent chain links 64 preferably formed of molded acetal, polyester, or nylon resin, and at least one and preferably several collector flight attachment links 66 positioned at spaced intervals in the chain 36 for supporting the flights 56. While the flight attachment links 66 can be variously configured, a preferred attachment link configuration is illustrated in FIGS. 4-10. The illustrated attachment link 66 is designed to have improved torsional flexibility and load bearing capabilities, as will be further explained below, and is preferably formed of molded acetal resin.

Each flight attachment link 66 includes a lower link portion 68 which is constructed similarly to the chain link 64. Hence, the chain links 64 and lower link portions 68 will be described together.

Each chain link 64 and lower link portion 68 includes elongated, laterally flattened and generally parallel left and right sidearms or sidebars 70 and 72. In the illustrated arrangement the sidebars of the links 64 have arcuate upper and lower edges while the sidebars of the link portions 68 have arcuate lower edges but linear upper edges. (see FIG. 3)

The sidebars 70 and 72 are respectively provided with hubs 74 and 75 which project outwardly and laterally from the forward ends thereof. A pair of reinforcing ribs 76 extend rearwardly from each of the hubs 74 and 75. The hubs 74 and 75 have therein respective transversely extending pin bores 78 and 79 which are generally coaxially aligned with one another. The hubs 74 and 75 are also provided with pin retention means. While various pin retention means can be employed, in the illustrated construction the pin retention means includes oppositely positioned bosses 80 extending from the outer end of the hub 74 and a ring member 82 integrally formed with and encircling the respective pin bore 79 of the hub 75.

The links 64 and link portions 68 also each include a barrel member or spacer bushing 84 which extends between the rearward ends of the sidebars 70 and 72 and which has therein a pin bore 86 that extends through each of the sidebars 70 and 72.

As shown in the drawings, the attachment link 66 also includes a cantilevered collector flight support portion 90 projecting upwardly from the link portion 68. The flight support portion 90 includes a planar pusher or paddle plate 92 positioned centrally above and transversely to the sidebars 70 and 72. The paddle plate 92 has a split construction and includes laterally spaced apart left and right plate sections 94 and 96 respectively adjacent the upper edges of the left and right sidebars 70 and 72 of the attachment link 66. A web section 98 interconnects the upper end portions of the plate sections 94 and 96 and spans the space between the sidebars 70 and 72. The forwardly facing surfaces of the plate sections 94 and 96 and the web section 98 combine to form a front support surface 100 for a flight 56. The plate sections 94 and 96 are each provided with a pair of mounting holes 102 for receiving fasteners, such as bolts 104, to secure a flight 56 to the support surface 100.

The flight support portion 90 also includes left and right reinforcement or gusset members 106 and 108. The left and right gussets 106 and 108 respectively extend integrally from the upper edge of the left sidebar 70 to the rearwardly facing back surface of the left plate section 94, and from the upper edge of the right sidebar 72 to the back surface of the right plate section 96. The gussets 106 and 108 are angled downwardly and rearwardly.

The flight support portion 90 is provided with notches 110 which are preferably semicircular and which in the specific embodiment illustrated in the drawings have a one quarter inch radius. The notches 110 separate the upper edges of the sidebars 70 and 72 from the lower edges of the plate sections 94 and 96 and reduce stress concentration occuring at the junctures of the sidebars 70 and 72 and the gussets 106 and 108.

One of the features of applicant's invention is the recognition that flexibility of an attachment link is not only acceptable in a chain for use in supporting a collector flight in a wastewater treatment tank, but it is preferred that the attachment link have flexibility. In the prior art arrangements it was thought to be important to make the attachment link as rigid as possible in order to increase the strength of the attachment link. Rigidity was thought to provide increased strength to the attachment device. One aspect of applicant's invention is the recognition and discovery that because of the application for the attachment links, flexibility of the attachment links and the structural components of the attachment links improves the effective life and the ultimate failure strength of the attachment links.

The configuration of the above described attachment link 66, and particularly the provision of the split paddle construction and the notches 110, was tested to determine the maximum angle of torsional deflection and the ultimate torsional strength at failure. Three different attachment links 66 were tested and the results of these tests are as follows:

| Link | Angle At Failure (Degrees) | Torque (Ft.-Lbs.) |
| --- | --- | --- |
| 1 | 21 | 294 |
| 2 | 18 | 267 |
| 3 | 20 | 294 |

The same test was performed on two attachment links of conventional design (i.e. without the split paddle construction or notches) and the test results are as follows:

| Link | Angle At Failure (Degrees) | Torque (Ft.-Lbs.) |
| --- | --- | --- |
| 1 | 15 | 256 |
| 2 | 15 | 214 |

As the above test results bear out, the attachment links 66 employing the split paddle construction and the notches 110 were found to be capable of withstanding on average 30%–40% greater torsional deflection than were standard attachment links. Additionally, the attachment links 66 were found to be capable of withstanding on average a 21% greater torsional load before failure than were standard attachment links. This was so despite the removal of material from the paddle plate.

Tests were also performed on attachment links having split paddle constructions without the web section 98 and with and without the notches 110. However, the above described attachment link 66 including the web section 98 and the notches 110 performed optimally.

The chain 36 also comprises a plurality of chain pins 112 for interconnecting adjacent chain links 64 and link portions 68. As shown in FIG. 2, the pins 112 each include a shaft portion 114 having at one end a head 116 with opposite flattened edge portions 118 so that the head 118 fits between the bosses 80, and at the other end a molded circumferential groove 120.

To construct the chain 36, the forward ends of the sidebars 70 and 72 of one chain link 64 or link portion 68 are spread apart to receive therebetween the rearward end of an adjacent second link 64 or link portion 68 so that the pin bores 78 and 79 of the one link 64 or link portion 68 are generally coaxially aligned with the pin bore 86 of the second link 64 or link portion 68. A chain pin 112 is then inserted into the coaxially aligned bores so that the ring member 82 engages the groove 120 on the pin 112 to prevent the pin 112 from becoming dislodged from the joined links, and so that the head 116 fits between the bosses 80 to restrict pin rotation. Subsequent links 64 and link portions 68 are connected in a similar fashion.

Other features and advantages of the invention are set forth in the following claims.

We claim:

1. A collector flight attachment link for supporting a collector flight on a chain including a plurality of interconnected chain links, said collector flight attachment link comprising:
   an elongated lower link portion adapted to be interconnected wit adjacent chain links in the chain; and
   a cantilevered collector flight support portion projecting upwardly from said link portion, said collector flight support portion including a bifurcated support plate extending transversely to said link portion and having spaced apart first and second plate sections each including a lower edge and an upper edge, said first and second plate sections defining therebetween an open space, and said first and second plate sections each including a forwardly facing surface, said forwardly facing surfaces together defining a support surface adapted to support the collector flight, and a web section spanning said open space and interconnecting said first and second plate sections, said web section including upper and lower edges, said open space extending in a direction transverse to said upper and lower edges of said first and second plate sections a distance greater than the distance between said upper and lower edges of said web section.

2. A collector flight attachment link as set forth in claim 1, wherein each of said first and second plate sections includes an upper end portion, wherein said web section interconnects said upper end portions of said first and second plate sections, and wherein said open space extends from said lower edges of said first and second plate sections to said lower edge of said web section, the distance between said lower edges of said first and second plate sections and said lower edge of said web section being greater than said distance between said upper and lower edges of said web section.

3. A collector flight attachment link as set forth in claim 1, wherein said support plate is spaced above said link portion, and wherein said collector flight support portion has therein a notch separating said link portion from said support plate.

4. A collector flight attachment link as set forth in claim 3, wherein said notch is generally semicircular.

5. A collector flight attachment link as set forth in claim 1, wherein said link portion includes laterally spaced apart first and second sidebars each including an upper edge portion, wherein said first and second plate sections are laterally spaced apart and are respectively positioned adjacent said upper edge portions of said first and second sidebars, each of said first and second plate sections including a rearwardly facing surface, and wherein said collector flight support portion includes first and second reinforcement members, said first reinforcement member extending integrally between said upper edge portion of said first sidebar and said rearwardly facing surface of said first plate section, and said second reinforcement member extending integrally between said upper edge portion of said second sidebar and said rearwardly facing surface of said second plate section.

6. A collector flight attachment link as set forth in claim 5, wherein said collector flight support portion has therein a pair of arcuate notches, one of said notches being positioned between said first plate section and said first sidebar, and the other of said notches being positioned between said second plate section and said second sidebar.

7. A collector flight attachment link for supporting a collector flight on a chain including a plurality of interconnected chain links, said collector flight attachment link comprising:
   a chain link portion adapted to be interconnected with adjacent chain links in the chain; and
   a cantilevered collector flight support portion projecting upwardly from said chain link portion, said collector flight support portion including a support plate extending transversely to said chain link portion, positioned above said chain link portion, and including a forwardly face surface defining a support surface adapted to support the collector flight, and said collector flight attachment link portion including an arcuate notch separating said support plate from said chain link portion.

8. A collector flight attachment link as set forth in claim 7, wherein said chain link portion includes first and second spaced apart sidebars, wherein said support plate includes first and second spaced apart plate sections and a web section interconnecting said plate sections, said first plate section being positioned entirely above said first sidebar and said second plate section being positioned entirely above said second sidebar, and wherein said collector flight support portion includes a pair of arcuate notches, one of said notches separating said first plate portion from said first sidebar and the other of said notches separating said second plate portion from said second sidebar.

9. A collector flight attachment link as set forth in claim 8, wherein each of said first and second plate sections includes an upper end portion, and wherein said web section interconnects said upper end portions of said first and second plate sections.

10. A collector flight attachment link as set forth in claim 7, wherein said notch is generally semicircular.

11. A collector flight attachment link as set forth in claim 7, wherein said support plate includes a rearwardly facing surface, and wherein said collector flight support includes a reinforcement member extending between said chain link and said rearwardly facing surface.

12. A collector flight attachment link as set forth in claim 8, wherein each of aid first and second plate sections includes a rearwardly facing surface, wherein said collector flight support portion includes first and second reinforcement members, said first reinforcement member extending between said first sidebar and said rearwardly facing surface of said first plate section, and said second reinforcement member extending between said second sidebar and said rearwardly facing surface of said second plate section, and wherein each of said first and second reinforcement members includes one of said notches.

13. A collector flight support chain supported for cylindrical operation by drive means to convey a collector flight through a tank containing a liquid to facilitate removal of wastes from the liquid, said collector flight support chain comprising:
   a plurality of adjacent chain links;
   a collector flight attachment link including a lower link portion forming one of said chain links, and a cantilevered collector flight support portion projecting upwardly from said link portion, said collector flight support portion including bifurcated a support plate extending transversely to said link portion and having spaced apart first and second plate sections each including a lower edge and an upper edge, said first and second plate sections defining therebetween an open space, and said first and second plate sections each including a forwardly facing surface, said forwardly facing surfaces together defining a support surface adapted to support the collector flight, and a web section spanning said open space and interconnecting said first and second plate sections, said web section including upper and lower edges, and said open space extending in a direction transverse to said upper and lower edges of said first and second plate sections a distance greater than the distance between said upper and lower edges of said web section; and a plurality of chain pins for joining said adjacent chain links together to form said chain.

14. A collector flight support chain as set forth in claim 13, wherein said support plate is spaced above said link portion, and wherein said collector flight support portion has therein a notch separating said link portion from said support plate.

15. A collector flight support chain as set forth in claim 13, wherein said link portion includes laterally spaced apart first and second sidebars each including an upper edge portion, wherein said first and second plate sections are laterally spaced apart and are respectively positioned adjacent said upper edge portions of said first and second sidebars, each of said first and second plate sections including a rearwardly facing surface, and wherein said collector flight support portion includes first and second reinforcement members, said first reinforcement member extending between said upper edge portion of said first sidebar and said rearwardly facing surface of said first plate section, and said second reinforcement member extending between said upper edge portion of said second sidebar and said rearwardly facing surface of said second plate section.

16. A collector flight support chain as set forth in claim 15, wherein said support plate includes a web section interconnecting said first and second plate sections, and wherein each of said first and second reinforcement members has therein a notch, said notch in said first reinforcement member separating said first plate section from said first sidebar and said notch in said second reinforcement member separating said second plate section from said second sidebar.

17. A collector flight attachment link as set forth in claim 1, wherein said open space has a vertical extent which is greater than said distance between said upper and lower edges of said web section.

18. A collector flight attachment link as set forth in claim 1, wherein said open space extends from one of said lower edges of said first and second plate sections and said upper edges of said first and second plate sections toward the other of said lower edges of said first and second plate sections and said upper edges of said first and second plate sections a distance at least as great as said distance between said upper and lower edges of said web section.

19. A collector flight attachment link as set forth in claim 1, wherein said support plate is positioned entirely above said lower link portion.

20. A collector flight attachment link as set forth in claim 13, wherein said open space has a vertical extent which is greater than said distance between said upper and lower edges of said web section.

21. A collector flight attachment link as set forth in claim 13, wherein said open space extends from one of said lower edges of said first and second plate sections and said upper edges of said first and second plate sections toward the other of said lower edges of said first and second plate sections and said upper edges of said first and second plate sections a distance at least as great as said distance between said upper and lower edges of said web section.

22. A collector flight attachment link as set forth in claim 13, wherein said support plate is positioned entirely above said lower link portion.

23. A collector flight support chain as set forth in claim 14, wherein said notch is semicircular.

24. A collector flight support chain supported for cyclical operation by drive means to convey a collector flight through a tank containing a liquid to facilitate removal of wastes from the liquid, said collector flight support chain comprising:

a plurality of adjacent chain links;

a collector flight attachment link including a lower link portion forming one of said chain links, and a cantilevered collector flight support portion projecting upwardly from said link portion, said collector flight support portion including a support plate extending transversely to said chain link portion, positioned above said chain link portion, and including a forwardly facing surface defining a support surface adapted to support the collector flight, and said collector flight attachment link portion including an arcuate notch separating said support plate from said chain link portion.

* * * * *

UNITED STATES PATENT AND TRADEMARK OFFICE
CERTIFICATE OF CORRECTION

PATENT NO. : 5,165,522
DATED : November 24, 1992
INVENTOR(S) : James H. Wiegand, et al It is certified that error appears in the above-indentified patent and that said Letters Patent is hereby corrected as shown below:

On the title page, Item [56]: Under References Cited:

the date of the Hannum reference should be 2/1987;

the date of the Wiegand et al. reference should be 8/1990; and the word "Collectors" in the title of the first cited publication is mispelled.

Col. 7 Claim 1, line 6, "wit" should read --with--
Col. 8 Claim 12, line 44, "aid" should read --said--
Col. 8 Claim 13, line 56, "cylinderical" should read --cyclical--

Col. 8 Claim 13, line 64, "bifurcated a " should read --a bifurcated--

Signed and Sealed this

Twelfth Day of October, 1993

Attest:

BRUCE LEHMAN

*Attesting Officer*     *Commissioner of Patents and Trademarks*